United States Patent [19]

Kosai

[11] Patent Number: 5,451,786
[45] Date of Patent: Sep. 19, 1995

[54] UNCOOLED MIS CAPACITOR FOR INFRARED DETECTION

[75] Inventor: Kenneth Kosai, Goleta, Calif.

[73] Assignee: Santa Barbara Research Center, Goleta, Calif.

[21] Appl. No.: 229,972

[22] Filed: Apr. 19, 1994

[51] Int. Cl.[6] .................................................. G01J 5/34
[52] U.S. Cl. ............................. 250/338.4; 250/332; 250/370.08; 374/178; 374/184; 257/290
[58] Field of Search ................. 257/290; 374/184, 183, 374/178; 250/338.4, 332, 370.08

[56] References Cited

U.S. PATENT DOCUMENTS

| | | | |
|---|---|---|---|
| 3,497,698 | 2/1970 | Phelan, Jr. et al. | 257/290 |
| 3,562,425 | 2/1971 | Poirier | 257/290 X |
| 3,786,441 | 1/1974 | Engeler et al. | 257/290 X |
| 4,197,469 | 4/1980 | Cheung | 250/338.4 |
| 4,210,922 | 7/1980 | Shannon | 250/338.4 X |
| 4,603,258 | 7/1986 | Sher et al. | 250/338.4 X |

FOREIGN PATENT DOCUMENTS

| | | | |
|---|---|---|---|
| 2017497 | 5/1970 | France | 250/338.4 |
| 57-206838 | 12/1982 | Japan | 250/338.4 |

OTHER PUBLICATIONS

Stecki et al., "Application of Charge-Coupled Devices to Infrared Detection and Imaging," IEEE, vol. 63, No. 1, 1975 pp. 67–74.

Thom et al., "InSb CCDs and Other Mis Devices for Infrared Applications," 1975 International Conference on the Application of Charge-Coupled Devices, San Diego, Calif., Oct. 29-31, 1975 pp. 31–41.

Sher et al., "Photocapacitive Mis Infrared Detectors", Appl. Phys. Lett 32(11), 1978, pp. 713–715.

Primary Examiner—Constantine Hannaher
Assistant Examiner—Edward J. Glick
Attorney, Agent, or Firm—W. C. Schubert; W. K. Denson-Low

[57] ABSTRACT

An uncooled thermal detector (10) includes a MIS capacitor (12) that is suspended from a material (26, 26a) having a low thermal conductivity. The MIS capacitor includes a doped semiconductor body portion (14) having a gate dielectric (20), a gate electrode (22), and a second electrode (24) disposed over a surface thereof. In operation, the capacitance of the MIS capacitor at a frequency near a high-frequency/low-frequency transition is measured or sensed. As the temperature of the MIS capacitor increases, the sensed capacitance increases because minority carriers are able to respond faster to a modulating gate voltage. Similarly, if the temperature decreases, the sensed capacitance decreases, because the minority carriers respond more slowly. A high thermal coefficient of capacitance (>20%/K) is achieved at all gate bias values for which the MIS capacitor is in inversion. By a suitable choice of doping level and the introduction of a deep level (24) to control the minority-carrier lifetime, the transition frequency may be tailored to a desired operating frequency at a given temperature. A method for fabricating the uncooled detector, and an array of same, within a Si film (2) of an SOI wafer (1) is also disclosed.

15 Claims, 9 Drawing Sheets

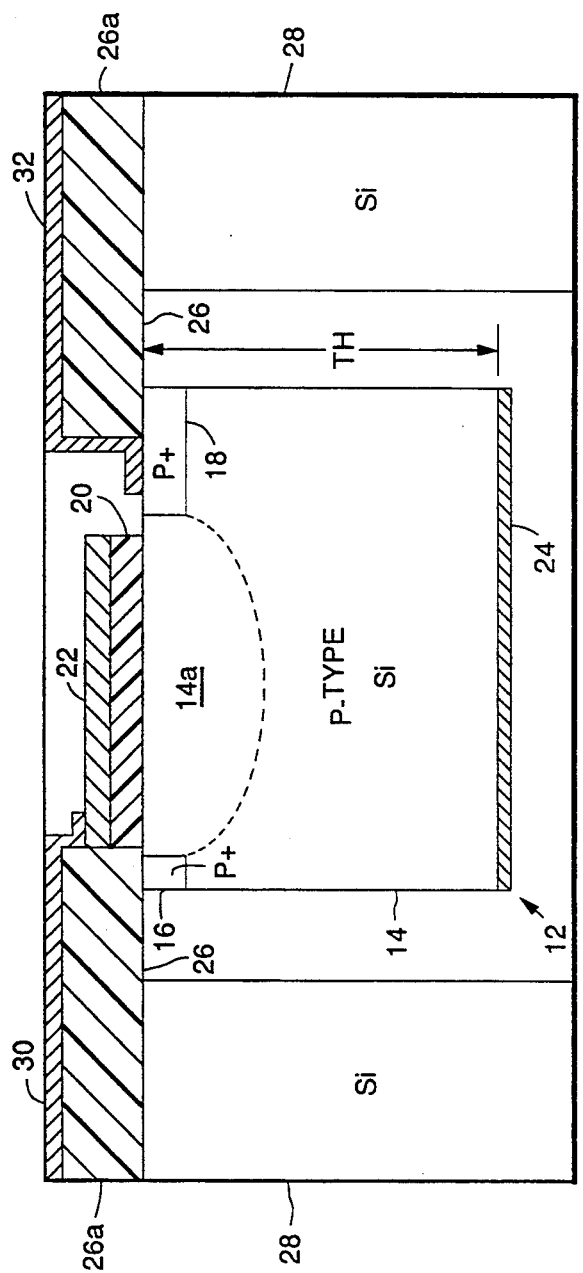
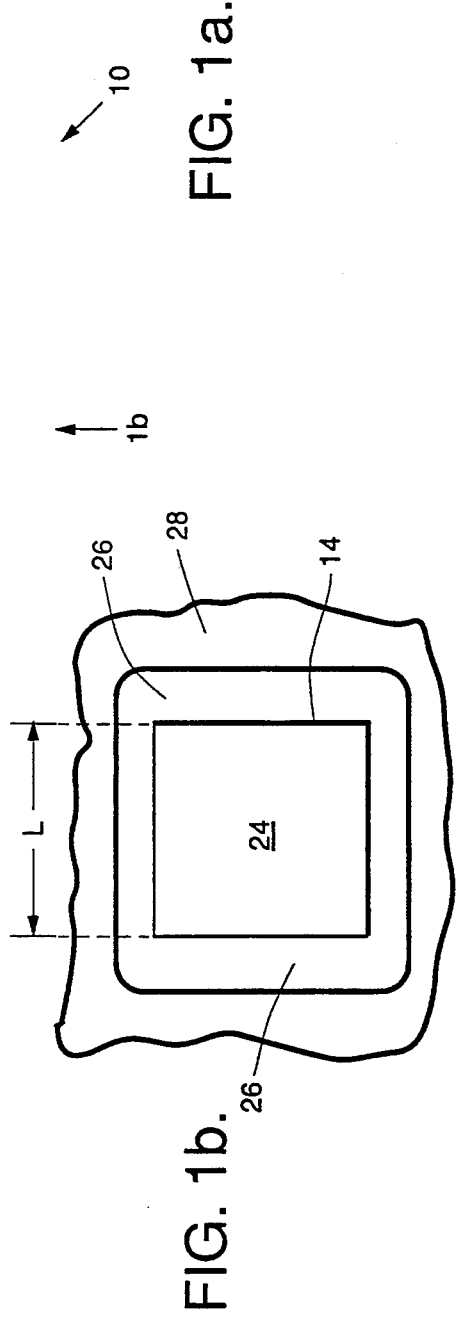
FIG. 1a.
FIG. 1b.

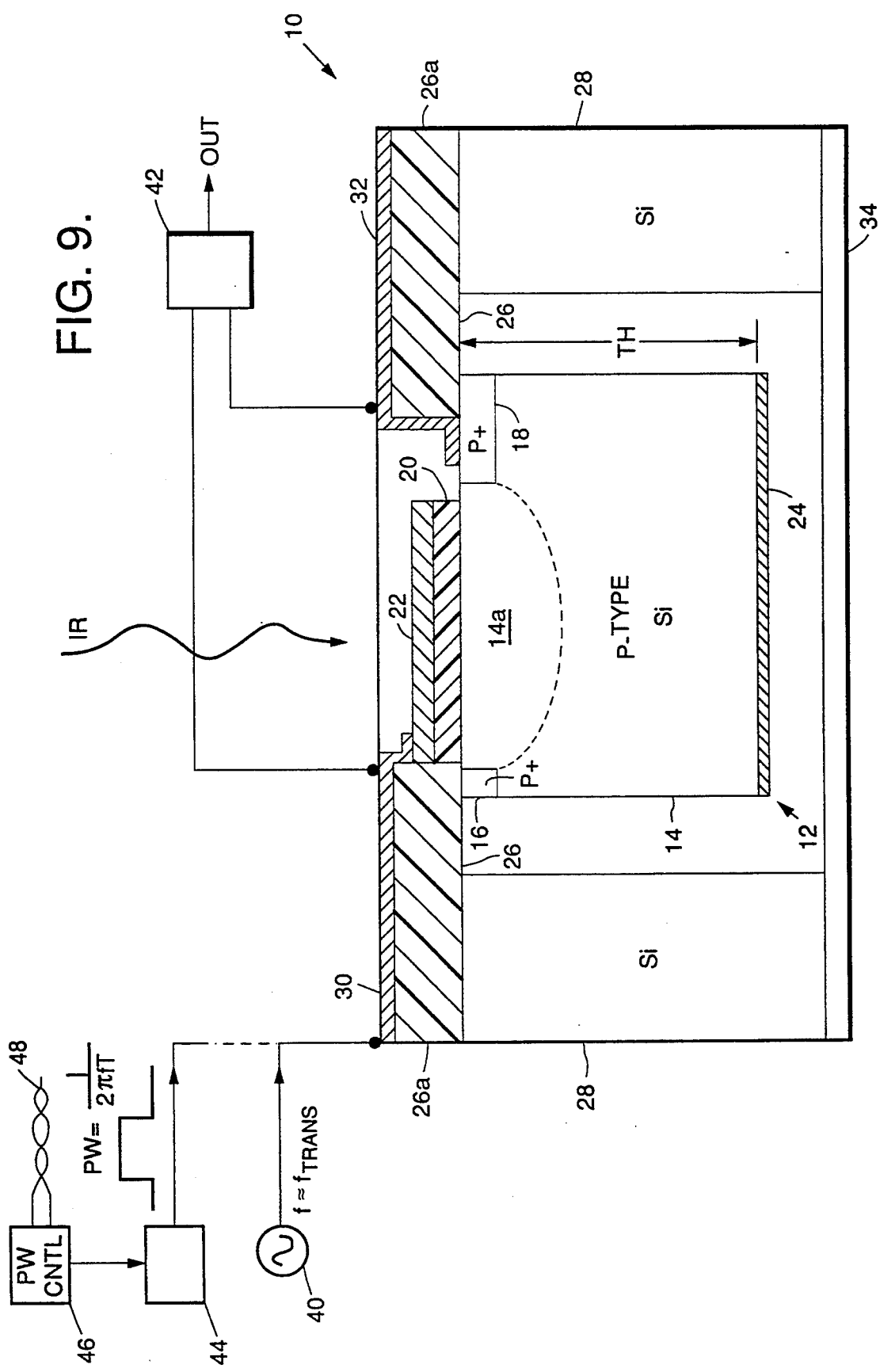

UNCOOLED MIS CAPACITOR FOR INFRARED DETECTION

FIELD OF THE INVENTION

This invention relates generally to radiation detectors and, in particular, to thermal radiation detectors that employ a capacitive sensing element.

BACKGROUND OF THE INVENTION

Many imaging arrays for infrared (IR) radiation, particularly those comprised of a Group II–VI semiconductor material such as mercury-cadmium-telluride (HgCdTe), are required to be cooled to cryogenic temperatures during operation. As a result, the imaging system is required to include a suitable cryogenic cooler assembly, and also baffling such as cold shields and/or warm shields for excluding stray thermal radiation from the imaging array.

As can be appreciated, for some low-cost applications the use of a cryogenically cooled imaging array may be undesirable.

An uncooled thermal capacitor detector is described in U.S. Pat. No. 4,058,729, "Pyroelectric Apparatus Including Effectively Intrinsic Semiconductor For Converting Radiant Energy Into Electric Energy". Other conventional uncooled devices are described in journal articles by A. Sher et al. (Appl. Phys. Lett. 32, 713 (1978), and Wilson and Cotton (Proc. IRIS Detector Specialty Group, 1985).

In general, these devices exhibit a largest responsivity if the semiconductor material is intrinsic, or nearly intrinsic. Because of the low level of semiconductor doping, the depletion layer is relatively large, on the order of tens of micrometers for silicon doped in the range of $10^{11}$ to $10^{12}$ atoms/cm$^3$. This necessitates a thick semiconductor, which results in an undesirable high thermal capacitance. Furthermore, the capacitance that is sensed is the static capacitance, which is undesirable for imaging applications where the detector must be read out rapidly. Another drawback to these conventional detectors is that the device must be biased close to the flat-band, or inversion threshold, of the thermal capacitor. That is, device modeling shows that temperature coefficient is bias dependent, and usefully large only for voltages in a range of one hundred millivolts about the flat-band and inversion-threshold voltages.

Other known approaches for providing uncooled thermal imaging arrays rely on bolometers made from $V_2O_3$, amorphous silicon, and pyroelectric materials. However, these materials have various incompatibilities with silicon processes. Furthermore, the reported thermal coefficient of $V_2O_3$ is only 2%/K.

SUMMARY OF THE INVENTION

It is thus an object of this invention to provide an uncooled thermal radiation detector that overcomes the problems of the prior art.

It is a further object of this invention to provide a thermal detector that includes a Metal-Insulator-Semiconductor (MIS) capacitor, that is compatible with conventional silicon processing methodologies, that exhibits a high thermal coefficient, and that is capable of being read out at rates that support imaging applications.

It is another object of this invention to provide a method of fabricating a thermal detector, and an array of same, within a thin film layer of a silicon-on-insulator (SOI) wafer.

The foregoing and other problems are overcome and the objects of the invention are realized by an uncooled thermal detector that includes a MIS capacitor that is suspended from a material having a low thermal conductivity. The MIS capacitor includes a doped semiconductor body portion having a gate dielectric, a gate electrode, and a second electrode disposed over a surface thereof. In operation, the capacitance of the MIS capacitor at a frequency near a high-frequency/low-frequency transition is measured or sensed. As the temperature of the MIS capacitor increases, the sensed capacitance increases because minority carriers are able to respond faster to a modulating gate voltage. Similarly, if the temperature decreases, the sensed capacitance decreases, because the minority carriers respond more slowly.

The exploitation of this detection mechanism, in accordance with this invention, can employ, but does not require, an application of a small-signal AC modulation to the gate bias of the MIS capacitor. Instead, the temperature-dependent capacitance may be sensed by charging the MIS capacitor with a current pulse of width $1/(2\pi f_T)$, where $f_T$ is a transition frequency from low-frequency to high-frequency behavior. For a fixed charge on the MIS capacitor, the voltage across the capacitor at the end of the charging pulse is proportional to its capacitance. As the device temperature increases, the capacitance increases and the sensed voltage decreases, and conversely, the sensed voltage increases as temperature decreases. An alternative method charges the MIS capacitor to a predetermined voltage, and measures the capacitance by sensing the amount of charge on the MIS capacitor.

This mode of operation provides a high thermal coefficient of capacitance ($>20\%/K$) at all gate bias values for which the MIS capacitor is in inversion. By a suitable choice of doping level and the introduction of a deep level to control the minority-carrier lifetime, the transition frequency may be tailored to a desired operating frequency at a given temperature. This makes the thermal detector of the invention suitable for use in imaging arrays in which the signal of a unit cell must be read in less than a frame time. Furthermore, if the thermal detector is read out in the pulsed mode described above, minor changes in ambient operating temperature can be accommodated by measuring the ambient temperature and changing the width of the charging pulse accordingly.

A method for fabricating the uncooled detector, and an array of same, within a Si film of an SOI wafer is also disclosed.

BRIEF DESCRIPTION OF THE DRAWINGS

The above set forth and other features of the invention are made more apparent in the ensuing Detailed Description of the Invention, when read in conjunction with the attached drawings, wherein:

FIG. 1a is cross-sectional view, not to scale, that illustrates a thermal capacitor detector in accordance with this invention;

FIG. 1b is a bottom view, not to scale, taken along the line 1b of FIG. 1a;

FIG. 9 is a cross-sectional view, not to scale, of the thermal detector of the invention coupled to excitation sources and a readout.

DETAILED DESCRIPTION OF THE INVENTION

Figure 2:
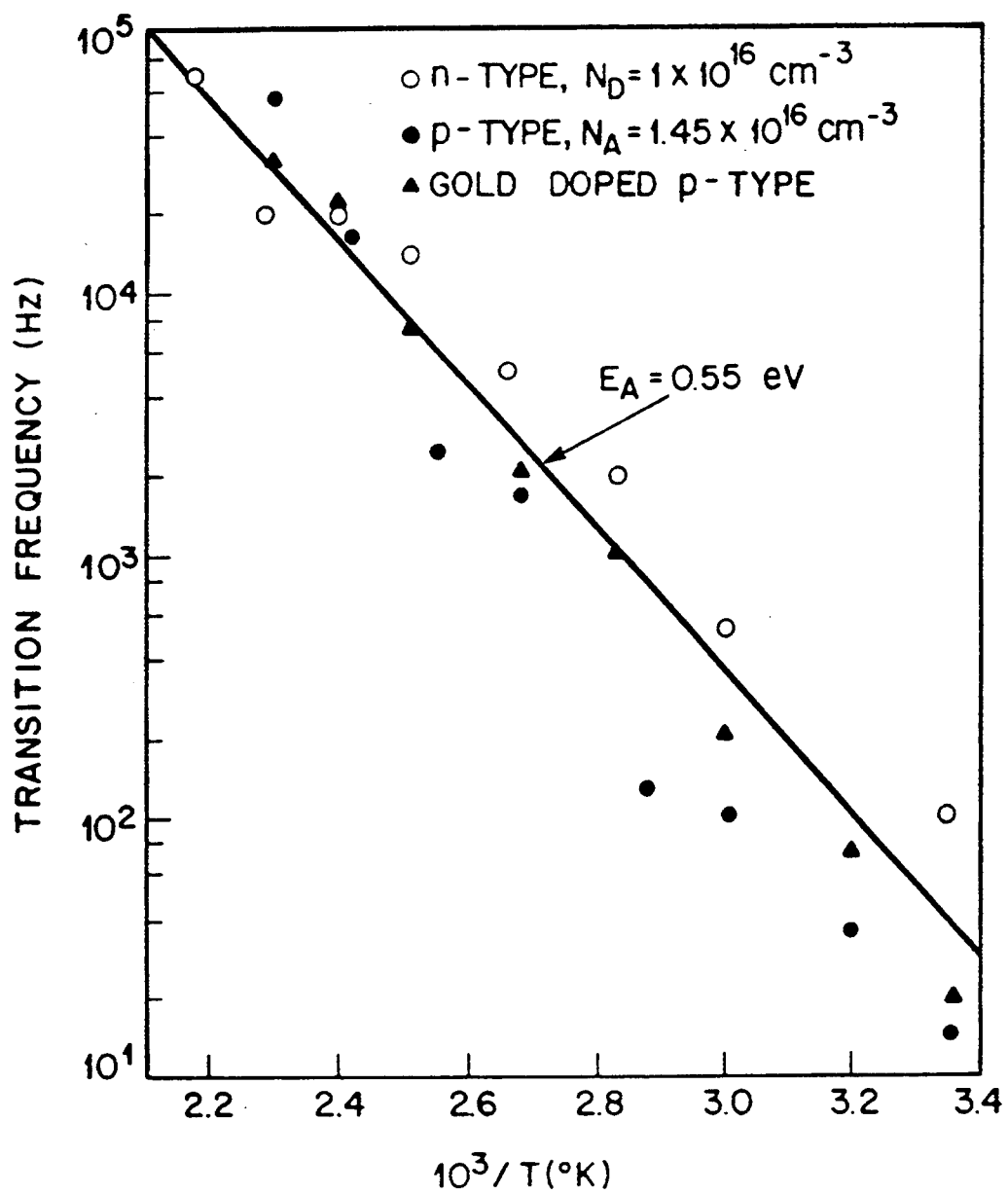
FIG. 2 is a graph that illustrates a temperature dependence of a transition frequency between high and low frequency C-V curves.

Referring to FIGS. 1a and 1b there is shown, not to scale, an uncooled radiation detector 10 that is constructed and operated in accordance with the invention. Detector 10 includes a Metal-Insulator-Semiconductor (MIS) capacitor 12 that includes a p-type silicon body 14 having p+ regions 16 and 18 that are adjacent to a first major surface thereof. Overlying the first major surface is a dielectric layer 20, such as silicon dioxide, and a layer of gate metalization 22 that overlies the silicon dioxide layer 20. A suitable thickness for the dielectric layer 20 is 0.1 micrometers. When a potential is applied to the gate metalization 22 an inversion region or layer, shown generally as 14a, is formed in the underlying p-type silicon body 14. The inversion layer 14a has with it an associated depletion region. The p+ regions 16 and 18 function as channel-stops to prevent unwanted inversion layers at the edges and bottom of the Si body 14 from supplying minority carrier holes to the inversion layer 14a under the gate metalization 22.

By example, the p-type silicon body 14 is doped with a suitable acceptor dopant, such as boron, at a concentration of approximately $10^{15}$ to $10^{16}$ atoms/cm$^3$. It is noted that these doping densities are significantly greater than those found in the intrinsic, or nearly intrinsic, thermal capacitors of the prior art. The p+ regions 16 and 18 are more heavily doped at a concentration of approximately $10^{18}$ atoms/cm$^3$. A suitable thickness (TH) for the Si body 14 is within the range of approximately 5 micrometers to approximately 10 micrometers, while each side may have a length (L) in the range of approximately 25 micrometers to approximately 50 micrometers. A region or layer of impurity doping 24 is also preferably applied to a second major surface to provide p+ lifetime control, as will be described below. Gold and platinum are two suitable metals for incorporation within the region of impurity doping 24.

The MIS capacitor 12 is thermally isolated from its environment by being suspended within a vacuum from a lip 26 of low thermal conductance material, such as a portion of a layer 26a of silicon dioxide from a surrounding silicon support 28. Overlying the silicon dioxide layer 26a and lip 26 are metal contacts 30 and 32.

Contact 30 is coupled to the gate metalization 22, while the contact 32 is coupled to the silicon body 14 at the p+ region 18. Contacts 30 and 32 thus provide for connecting the MIS capacitor 12 to external circuitry.

Having described the construction of the uncooled MIS capacitor 10, a description of the operation of same is now provided.

There are two temperature-dependent mechanisms which control a transition frequency between high-frequency and low-frequency capacitance-voltage (C-V) behavior. A first mechanism operates at room temperature in Si, and involves a generation-recombination of minority carriers through Shockley-Read-Hall centers in the depletion region associated with the inversion layer 14a. The second mechanism involves a generation-recombination of minority carriers in the bulk of the Si body 14, followed by diffusion into or out of the inversion layer 14a. The two mechanisms can be distinguished by their temperature dependence, wherein the first mechanism causes the transition frequency to vary as $\exp(-E_G/2kT)$, as shown in FIG. 2, while the second, diffusion-related mechanism causes the transition frequency to vary as $\exp(-E_G/kT)$. To control the transition frequency a deep-level, such as gold or platinum, can be introduced into the inversion region 14a or the back surface of the MIS capacitor 14. The latter is accomplished by the layer 24 shown in FIGS. 1a and 1b, and is a preferable method because it avoids the risk of degrading the Si-SiO$_2$ interface that exists between the silicon body 14 and the gate dielectric layer 20. By example, gold is commonly used in Si bipolar transistors and diodes to reduce minority carrier storage time in fast switching devices.

An important aspect of the thermal detector 10 of this invention relies on the fact that the small-signal AC capacitance of a MIS capacitor, when biased into inversion, depends on the frequency of the AC excitation. At high electrical frequencies, the capacitance is low because minority carriers are unable to maintain quasi-thermal equilibrium with the rapidly varying width of the depletion region that is associated with the inversion layer 14a. At low frequencies, the capacitance is high, approaching the insulator capacitance, because the minority carriers are able to respond to the modulation of the depletion region induced by the gate voltage. The frequency at which the inversion capacitance transitions from low-frequency to high-frequency behavior is exponentially dependent on temperature, as depicted in FIG. 2. FIG. 2 shows three cases of the dependence of the transition frequency on inverse temperature: the open circles are for an MIS capacitor on n-type silicon with a donor concentration of $1 \times 10^{16}$cm$^{-3}$; the solid circles are for an MIS capacitor on p-type silicon with an acceptor concentration of $1.45 \times 10^{16}$cm$^{-3}$; and the solid triangles are for an MIS capacitor of p-type gold-doped silicon. The solid line represents the exponential function, $\exp(-E_A/kT)$, where $E_A = E_G/2 = 0.55$ eV, $E_G$ being the bandgap energy of silicon.

Figure 3:
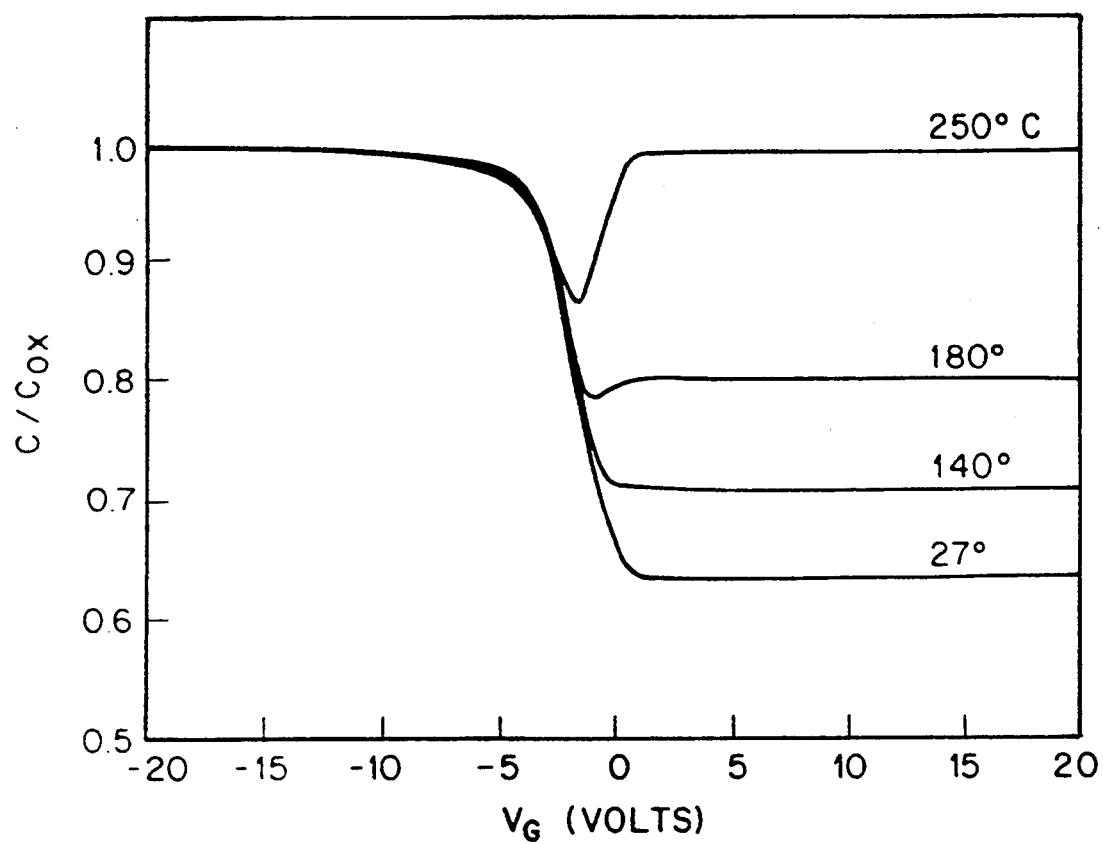
FIG. 3 is a graph that illustrates a normalized capacitance, at 100 Khz, as a function of bias with temperature as a parameter.

In accordance with this invention, this phenomenon is exploited by measuring the capacitance at a frequency near the transition frequency. As the temperature of the MIS capacitor increases, the capacitance increases because the minority carriers are able to respond more rapidly to the modulated gate potential. Similarly, if the temperature decreases, the measured capacitance decreases, because the minority carriers respond more slowly. This behavior is shown in FIG. 3.

However, the exploitation of this detection mechanism does not require an application of a small-signal AC modulation to the bias on the gate metalization 22. Instead, the temperature-dependent capacitance may be sensed by charging the MIS capacitor 12 with a current pulse of width $1/(2\pi f_T)$, where $f_T$ is the transition frequency from low-frequency to high-frequency behavior. For a fixed charge on the MIS capacitor 12, the voltage across the capacitor at the end of the charging pulse is proportional to its capacitance. As the device temperature increases, the capacitance increases and the sensed voltage decreases, and conversely, the sensed voltage increases as temperature decreases. An alternate method charges the MIS capacitor 12 to a predetermined voltage, and then measures the capacitance by sensing the amount of charge on the MIS capacitor 12.

This mode of operation provides a high thermal coefficient of capacitance (>20%/K) at all gate biases for which the MIS capacitor 12 is in inversion. By a suitable choice of doping level and the introduction of a deep level (layer 24) to control the minority-carrier lifetime, the transition frequency can be tailored to a desired operating frequency at a given temperature. This renders the thermal detector 10 suitable for use in imaging arrays in which the signal of a unit cell must be read in less than a frame time (<33 ms for a 30 Hz, noninterlaced system).

Furthermore, if the thermal detector 10 is read out in the pulse mode described above, minor changes in ambient operating temperature can be accommodated by measuring the ambient temperature and changing the width of the charging pulse accordingly.

Figure 4:
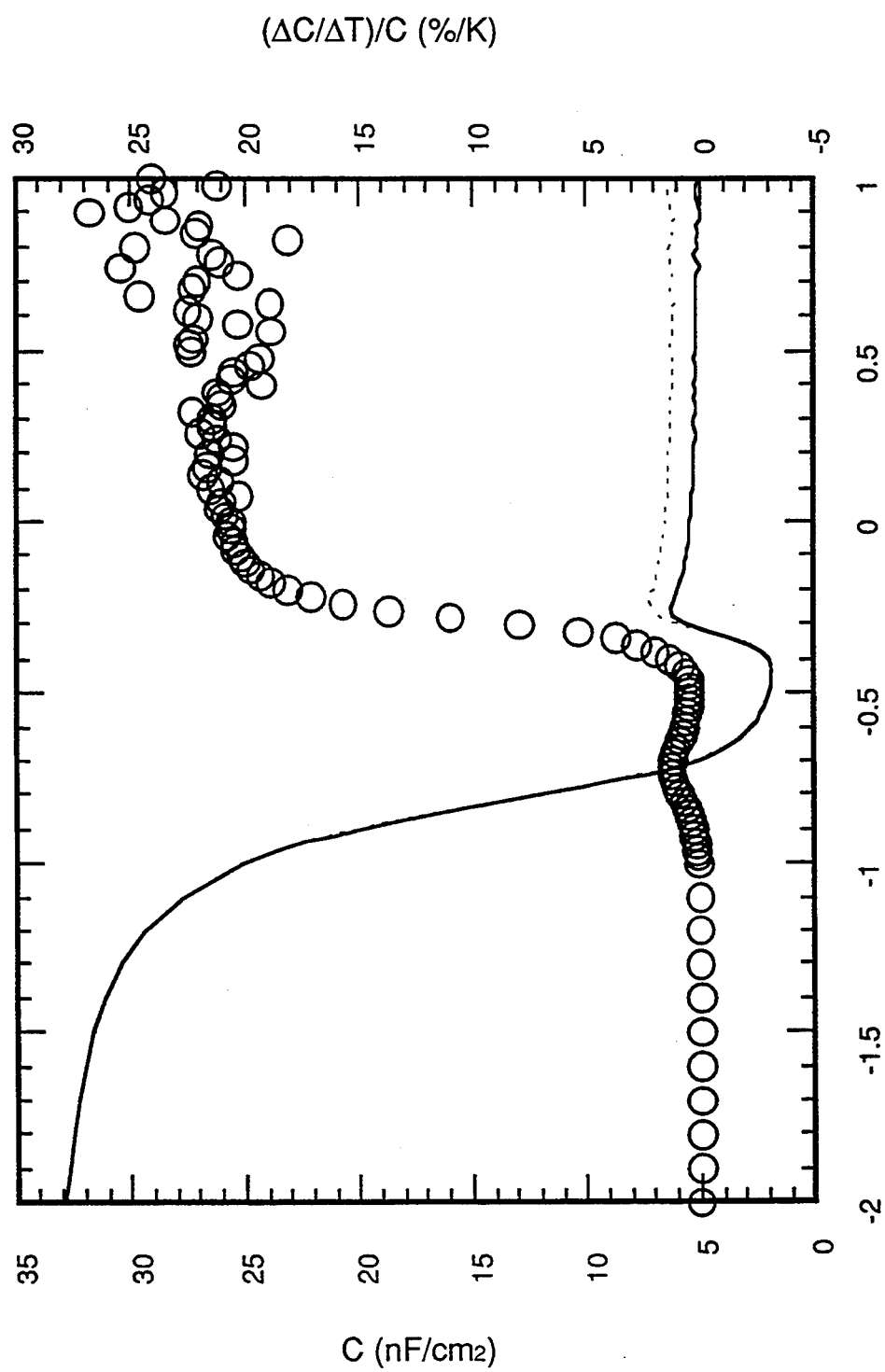
FIG. 4 is a graph that illustrates a calculated capacitance at 150 Hz and temperatures of 300K and 301K, in addition to a percentage change in capacitance.

FIG. 4 illustrates calculated C-V curves at 300K (solid line) and 301K (dashed line), as well as the thermal coefficient of capacitance (circles), for a MIS capacitor 12 having an aluminum gate 22, a silicon dioxide layer 20 thickness of 0.1 micrometers, and a thickness (TH) Of the Si body 14 of 10 micrometers. The frequency is 150 Hz, and is approximately the frequency that provides the maximum thermal coefficient at 300K. The scatter in the calculated thermal coefficient for gate bias voltages greater than 0.4V is numerical "noise" and is not significant.

Figure 5:
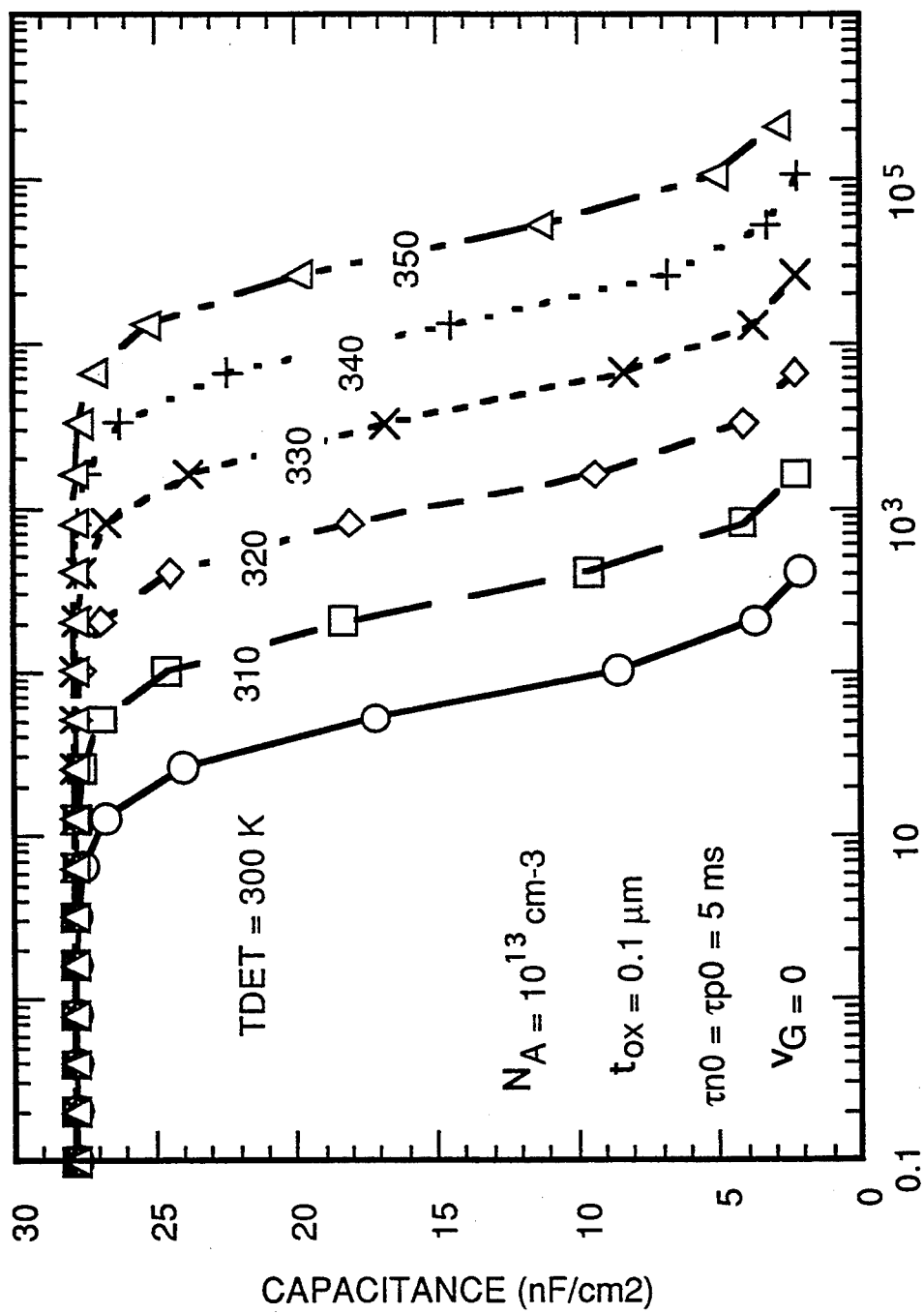
FIG. 5 is a graph that depicts a calculated capacitance at zero gate bias as a function of frequency with temperature as a parameter.

FIG. 5 is a plot showing the calculated zero-bias capacitance as a function of frequency with temperature as a parameter. For this plot, the temperature TDET was varied from 300 to 350K. P-type silicon doped to an acceptor concentration $N_A$ of $10^{13} cm^{-3}$ with an oxide thickness $t_{ox}$ of 0.1 microns was used with electron and hole lifetimes, $\tau n0$ and $\tau p0$ of 5 ms. The gate bias $V_G$ was zero. This set of curves shows that the frequency for transition from low-frequency to high-frequency behavior increases with temperature.

Figure 6:
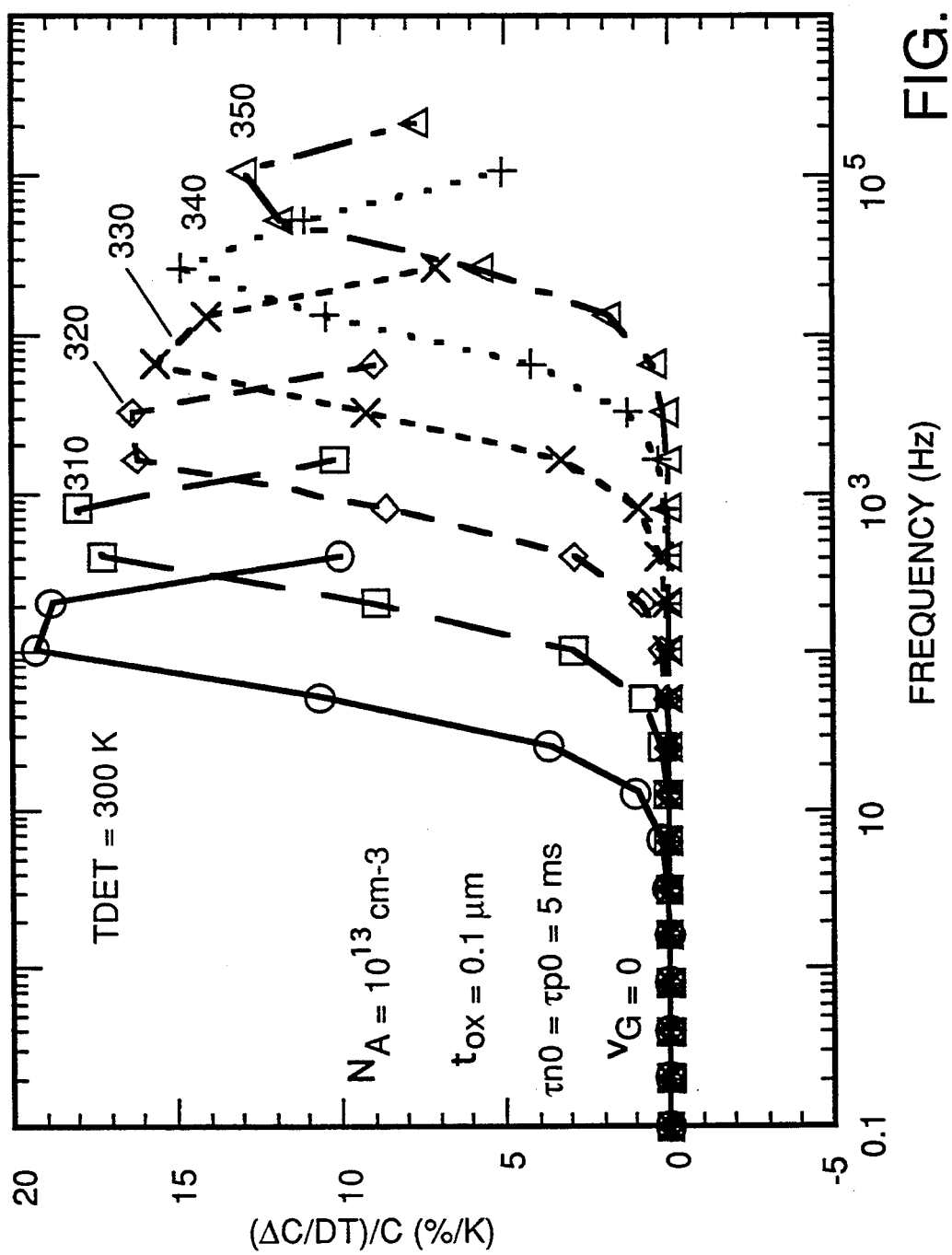
FIG. 6 is a graph illustrating a calculated thermal coefficient of capacitance as a function of frequency, with temperature as a parameter.

FIG. 6 shows the corresponding dependence on frequency for the thermal coefficient of capacitance. The parameters in FIG. 6 are the same as those in FIG. 5. The thermal coefficient of capacitance reaches a maximum near the transition frequency. The peak value of the thermal coefficient of capacitance decreases with increasing temperature, while the frequency at which the peak occurs increases with increasing temperature.

Figure 7:
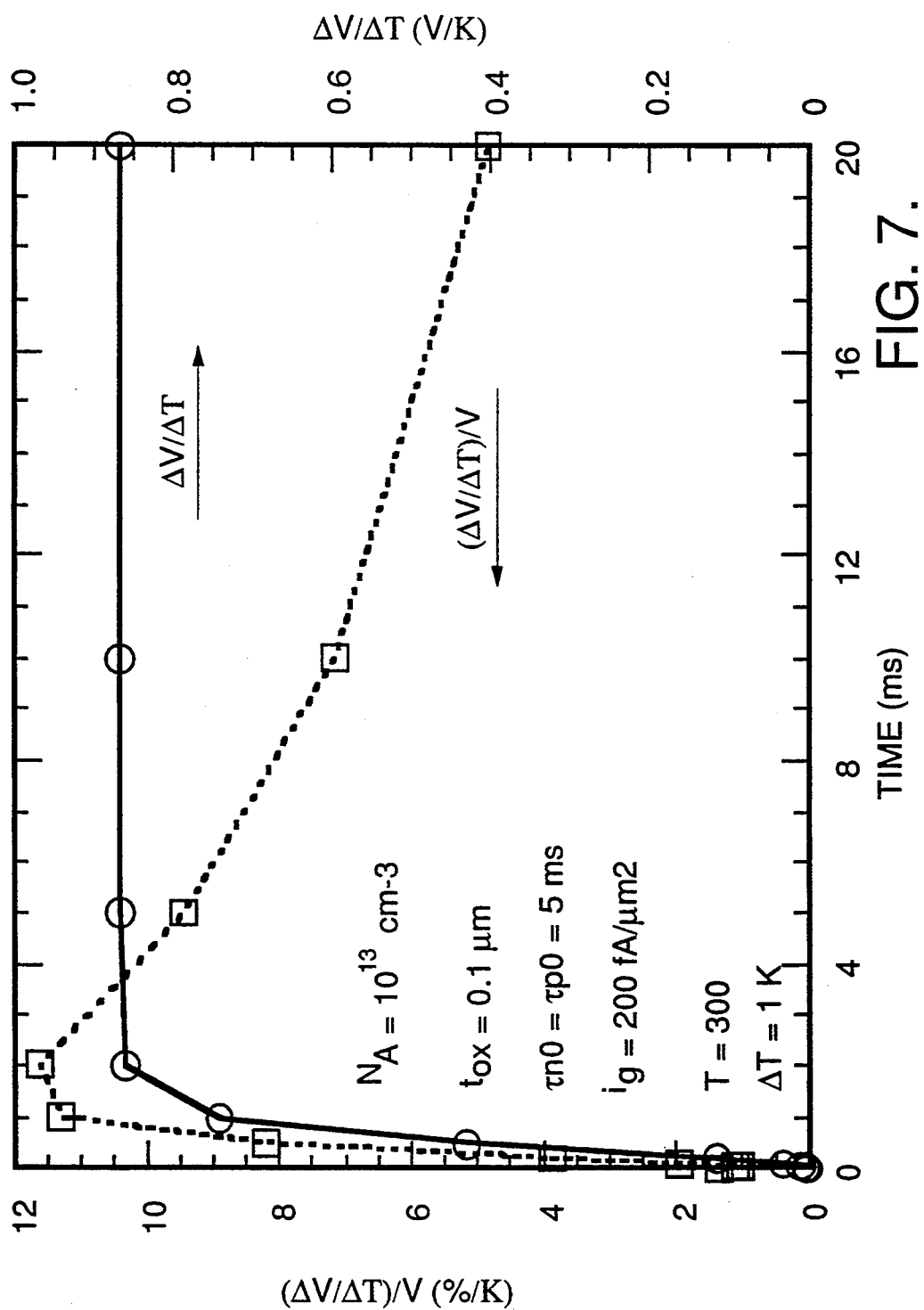
FIG. 7 is a graph illustrating a calculated time dependence of the thermal coefficient of capacitance and voltage change in response to an application of a constant current at time zero.

FIG. 7 shows the transient behavior of the thermal coefficient of capacitance when subjected to an increase in temperature of 1K from 300K at time zero (dashed curve with square symbols) and the charge in voltage per unit temperature difference (solid curve with circles) in response to the application of a current source, $i_g$, of 200 $fA/\mu m^2$ at time zero. The other quantities, $N_A$, $t_{ox}$, $\tau n0$, $\tau p0$ are the same as for FIGS. 5 and 6. The change in voltage saturates after 2 ms, while the thermal coefficient of the capacitance reaches a peak between 1 and 2 ms, then slowly decays to zero. The position of the peak in time is within a factor of two of the time of one millisecond calculated from $1/(2\tau 150)$, where 150 Hz is the peak frequency of the 300K curve in FIG. 6.

FIGS. 8a-8e are each a cross-sectional view showing a fabrication method of the invention. Processing starts in FIG. 8a with a silicon-on-insulator (SOI) wafer 1. Wafer 1 includes a thin layer 2 of silicon, an underlying dielectric layer 3 (silicon dioxide), and a supporting substrate 4. It is within the silicon layer 2 that the MIS capacitor 12 will be fabricated. As such, the layer 2 has a thickness that is at least equal to, and preferably greater than, the desired thickness of the MIS capacitor 12. The thicknesses of the layers 2 and 3 are not critical, in that these layers are removed by one of the processing steps described below. After doping the layer 2 with a suitable p-type dopant, the p+ regions 16 and 18 are formed on the exposed surface of the silicon layer 2 by conventional photolithography, followed by a diffusion or an ion implantation process.

Figure 8A:
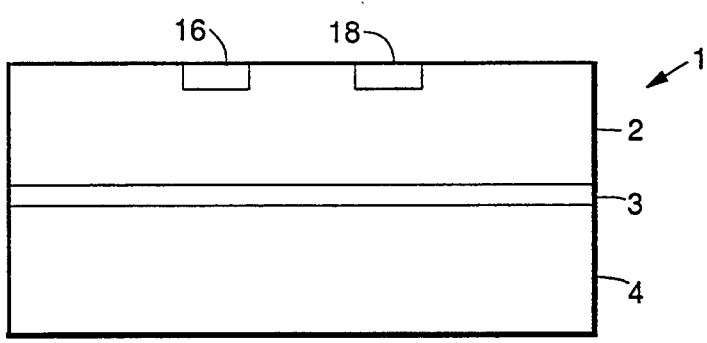
FIGS. 8a–8e illustrate steps of a method for fabricating the MIS capacitor-base thermal detector of FIGS. 1a and 1b.
Figure 8B:
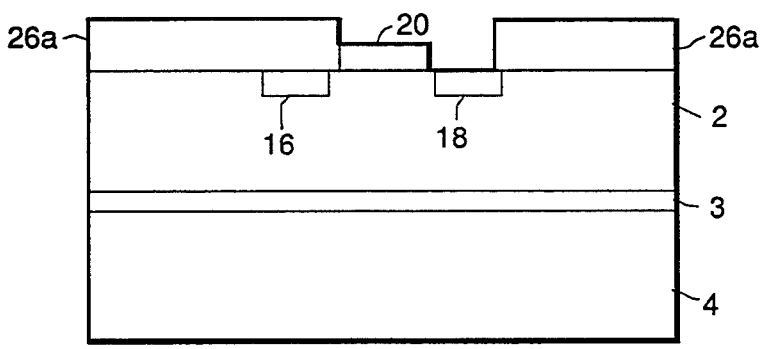

In FIG. 8b, the silicon dioxide layers 20 and 26a are formed over the exposed surface of the silicon layer 2.

Figure 8C:
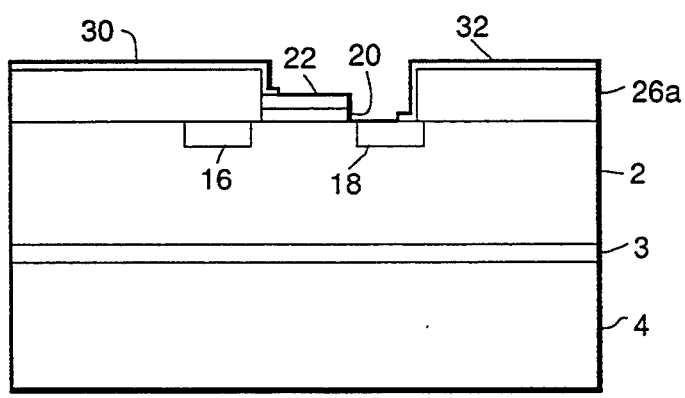

In FIG. 8c, the gate metalization 22 and the contact metalization 30 and 32 is formed by a conventional metalization process, such as masking and then sputtering aluminum onto the silicon dioxide layers 20 and 26a.

Figure 8D:
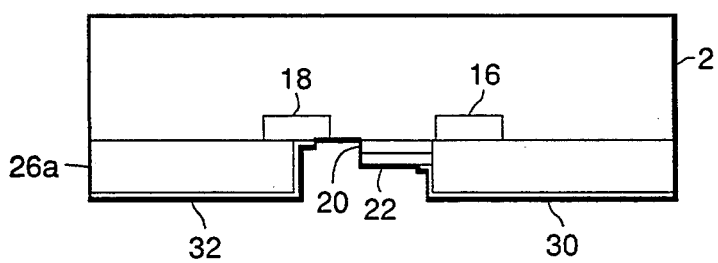

In FIG. 8d, the silicon substrate 4 and the dielectric layer 3 are removed. Removal can be accomplished by lapping until the bottom surface of the silicon layer 1 is exposed.

FIG. 8d shows the silicon layer 2 in an inverted position after the removal of the layers 3 and 4. It is noted that a temporary substrate (not shown) may be removably attached to the upper processed surface of the silicon layer 2 before removing the substrate 4 and dielectric layer 3. This facilitates the handling of the thin Si layer 2 and provides mechanical support for same during the ensuing processing steps.

Figure 8E:
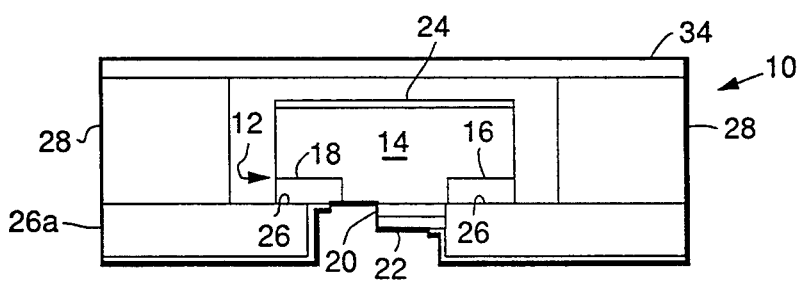

In FIG. 8e, the now exposed surface of the silicon layer 2 is masked and etched down to the silicon dioxide layer 26a so as to leave the silicon body 14 of the MIS capacitor 12 surrounded by a trench where a portion of the silicon layer 2 is removed. This results in the MIS capacitor 12 being attached to, or suspended from, the lip 26 of the silicon dioxide layer 26a. The silicon body 14 is then thinned by a desired amount so that the surface is recessed below the surrounding surface of the silicon layer 2. The deep trap impurity doping of the layer 24 is next applied.

Alternately, the Si layer 2 is etched to a depth corresponding to the desired depth of the recess, the metal layer 24 is applied and then masked, and then the Si layer 2 is once more etched to the silicon dioxide layer 26a so as to form the trench that surrounds the body portion 14.

Further processing applies a semiconductor or metal cover 34 so that the space surrounding the MIS capacitor 12 can be evacuated.

Although the method as described above fabricates but a single MIS capacitor structure, it should be realized that a plurality of such MIS capacitor structures can be simultaneously fabricated within a SOI wafer having a diameter of several hundred millimeters. As such, a linear or two dimensional array of uncooled thermal detectors can be provided for an imaging application.

FIG. 9 shows the thermal detector 10 receiving a thermal signal indicated by the arrow designated IR. The IR radiation is incident in the region of the gate contact 22. The region of incidence is provided with a suitable coating for absorbing the IR radiation and for transfering the resultant thermal signal into the MIS capacitor 12. Suitable coating materials include black gold and a multilayer, dielectric coating.

In one embodiment of the invention an excitation source is a sinusoidal source 40 that provides a 10 millivolt sinewave for modulating a dc bias potential on the gate 22. The frequency output by the source 40 is preferably approximately equal to the low-frequency/high-frequency transition frequency, as described above. A phase sensitive readout 42 is coupled to the contact 32 for sensing the thermally induced change in capacitance in the MIS capacitor 12.

In another embodiment of the invention the excitation source 44 provides a charging current pulse having a pulse width (PW) that is approximately equal to the quantity ($1/2\pi f_T$), as described above. In this embodiment the readout 42 measures the voltage across the MIS capacitor 12 at the end of the charging pulse. Further in accordance with this embodiment of the invention, a pulse width controller (PW CNTL) 46 has an input coupled to a temperature measuring device 48, shown schematically as a thermocouple. The temperature measuring device 48 measures an ambient temperature of the thermal detector 10, and the pulse width controller 44 adjusts the pulse width of the charging current pulse accordingly. As a result, the pulse width is maintained at an optimum value for sensing the thermally induced change in capacitance of the MIS capacitor 12. In like manner, the frequency of the sinusoidal source 40 can be varied as a function of ambient temperature.

In a further embodiment of the invention the excitation source 44 is operated at a 100% duty cycle to charge the MIS capacitor 12 to a predetermined voltage, as described above, at which time the readout 42 senses the amount of charge on the MIS capacitor 12. The amount of sensed charge is a function of the capacitance of the MIS capacitor 12.

Although described above in the context of specific dimensions, materials, dopants, dopant concentrations, and the like; it should be realized that these various parameters are not intended to be read in a limiting sense upon the practise of the invention.

Thus, while the invention has been particularly shown and described with respect to a preferred embodiment thereof, it will be understood by those skilled in the art that changes in form and details may be made therein without departing from the scope and spirit of the invention.

What is claimed is:

1. A method of operating a thermal detector, comprising the steps of:
    providing a metal-insulator-semiconductor MIS capacitor having an associated temperature dependent transition frequency between low-frequency C-V operation and high-frequency C-V operation;
    applying an electrical signal to said MIS capacitor, said electrical signal having a characteristic that is a function of the transition frequency; and
    responsive to the applied electrical signal, sensing a capacitance of the MIS capacitor, the sensed capacitance being a function of the temperature of the MIS capacitor.

2. A method as set forth in claim 1 wherein the characteristic is a frequency of the electrical signal.

3. A method as set forth in claim 2 wherein the frequency of the electrical signal is approximately equal to the transition frequency.

4. A method as set forth in claim 1 wherein the characteristic is a pulse width of the electrical signal.

5. A method as set forth in claim 4 wherein the pulse width of the electrical signal is approximately equal to $1/2\pi f_T$, where $f_T$ is the transition frequency.

6. A method as set forth in claim 1 and further comprising the step of:
    adjusting the characteristic of the applied electrical signal to compensate for a change in an ambient temperature of the MIS capacitor.

7. A method as set forth in claim 1 wherein the step of providing includes an initial step of adjusting the transition frequency to a desired value by the steps of:
    selecting a doping concentration for a semiconductor body portion of the MIS capacitor, the doping concentration being selected to provide a desired concentration of minority charge carriers within the semiconductor body portion; and
    providing a deep trap for the semiconductor body portion to control a lifetime of minority charge carriers within the semiconductor body portion.

8. A method as set forth in claim 1, wherein the step of applying includes an initial step of forming a depletion region within the semiconductor body portion.

9. A thermal detection system, comprising:
    at least one metal-insulator-semiconductor MIS capacitor having an associated temperature dependent transition frequency between low-frequency C-V operation and high-frequency C-V operation;
    means for applying an electrical signal to said at least one MIS capacitor, said electrical signal having a characteristic that is a function of the transition frequency; and
    means, responsive to the applied electrical signal, for sensing a capacitance of the at least one MIS capacitor, the sensed capacitance being a function of the temperature of the at least one MIS capacitor.

10. A system as set forth in claim 9 wherein the characteristic is a frequency of the electrical signal.

11. A system as set forth in claim 10 wherein the frequency of the electrical signal is approximately equal to the transition frequency.

12. A system as set forth in claim 9 wherein the characteristic is a pulse width of the electrical signal.

13. A method as set forth in claim 12 wherein the pulse width of the electrical signal is approximately equal to $1/2\pi f_T$, where $f_T$ is the transition frequency.

14. A system as set forth in claim 9 wherein said MIS capacitor includes a semiconductor body portion having a doping concentration selected to provide a desired concentration of minority charge carriers within the semiconductor body portion, said semiconductor body portion further including a deep trap for controlling a lifetime of minority charge carriers within the semiconductor body portion.

15. A system as set forth in claim 9, and further comprising:
    means for sensing an ambient temperature of said MIS capacitor; and
    means, responsive to said temperature sensing means, for adjusting the characteristic of the applied electrical signal to compensate for a change in the ambient temperature.

* * * * *